US012462383B2

(12) United States Patent
Sayyadinejad

(10) Patent No.: US 12,462,383 B2
(45) Date of Patent: Nov. 4, 2025

(54) ELECTRONIC DEVICE AND METHOD OF DISEASE PROGNOSIS BASED ON DEMOGRAPHIC INFORMATION AND ANATOMICAL IMAGE USING NEURAL NETWORK MODELS

(71) Applicant: SONY GROUP CORPORATION, Tokyo (JP)

(72) Inventor: Hoda Sayyadinejad, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 384 days.

(21) Appl. No.: 18/069,447

(22) Filed: Dec. 21, 2022

(65) Prior Publication Data
US 2024/0212133 A1    Jun. 27, 2024

(51) Int. Cl.
*G06T 7/00*      (2017.01)
*G06V 10/82*    (2022.01)
(Continued)

(52) U.S. Cl.
CPC ............ *G06T 7/0012* (2013.01); *G06V 10/82* (2022.01); *G16H 10/60* (2018.01); *G16H 20/00* (2018.01);
(Continued)

(58) Field of Classification Search
None
See application file for complete search history.

(56) References Cited

U.S. PATENT DOCUMENTS

2010/0121178 A1   5/2010  Krishnan
2012/0084092 A1*  4/2012  Kozuch ................. G16H 10/20
                                                            705/2
(Continued)

FOREIGN PATENT DOCUMENTS

CN      113037989 A     6/2021
CN      114121269 A     3/2022
(Continued)

OTHER PUBLICATIONS

Kramer, et al., "Smartphone based face recognition tool for the blind", 32nd Annual International Conference of the IEEE Engineering in Medicine and Biology, IEEE, Aug. 31-Sep. 4, 2010, 4538-4541 pages.

*Primary Examiner* — Haris Sabah
(74) *Attorney, Agent, or Firm* — CHIP LAW GROUP

(57) ABSTRACT

An electronic device and method for disease prognosis using neural network models and based on demographic information and anatomical image, is provided. The electronic device receives demographic information associated with a person. Based on application of a first neural network model on the demographic information, an ailment associated with an anatomical region of the person is determined. Based on the determined ailment, a second neural network model is selected from a set of neural network models. The second neural network model is applied on a received first set of images associated with the anatomical region of the person to determine a first disease severity corresponding to the determined ailment. The second neural network model is different from the first neural network model. A display device associated with the electronic device is controlled to render information about the determined first disease severity and the determined ailment.

20 Claims, 6 Drawing Sheets

(51) Int. Cl.
  *G16H 10/60* (2018.01)
  *G16H 20/00* (2018.01)
  *G16H 50/20* (2018.01)
  *G06F 3/048* (2013.01)
  *G06T 3/4046* (2024.01)

(52) U.S. Cl.
  CPC ............ *G16H 50/20* (2018.01); *G06F 3/048* (2013.01); *G06T 3/4046* (2013.01); *G06T 2200/24* (2013.01); *G06T 2207/20081* (2013.01)

(56) References Cited

U.S. PATENT DOCUMENTS

| | | |
|---|---|---|
| 2014/0316235 A1 | 10/2014 | Davis et al. |
| 2021/0251577 A1 | 8/2021 | Mihai |
| 2022/0039767 A1* | 2/2022 | Wang .................. A61B 5/7275 |

FOREIGN PATENT DOCUMENTS

| | | |
|---|---|---|
| KR | 102311654 B1 | 10/2021 |
| WO | 2022/035886 A1 | 2/2022 |

\* cited by examiner

ELECTRONIC DEVICE AND METHOD OF DISEASE PROGNOSIS BASED ON DEMOGRAPHIC INFORMATION AND ANATOMICAL IMAGE USING NEURAL NETWORK MODELS

CROSS-REFERENCE TO RELATED APPLICATIONS/INCORPORATION BY REFERENCE

None.

FIELD

Various embodiments of the disclosure relate to disease prognosis. More specifically, various embodiments of the disclosure relate to disease prognosis based on demographic information and anatomical image using neural network models.

BACKGROUND

Advancements in the field of disease prognosis have led to the development of contactless and non-invasive diagnosis techniques. Typically, the disease diagnosis may be performed based on collection of a body fluid or blood sample from a patient. The collected sample may be transported to a pathology laboratory and tested to diagnose ailments or diseases associated with the patient. Since, the existing invasive techniques take an ample amount of time period for sample collection, thus disease diagnosis may be a time-consuming process. Further, the sample collection and the disease diagnosis may be performed manually, and therefore, the disease diagnosis accuracy may be reduced due to human error. Furthermore, since the invasive techniques require a human contact, communicable disease may easily spread. Thus, it may be desirable to have an advanced disease prognosis technique that eliminates physical contact, enhances accuracy, and is time efficient.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for disease prognosis based on demographic information and anatomical image using neural network models is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
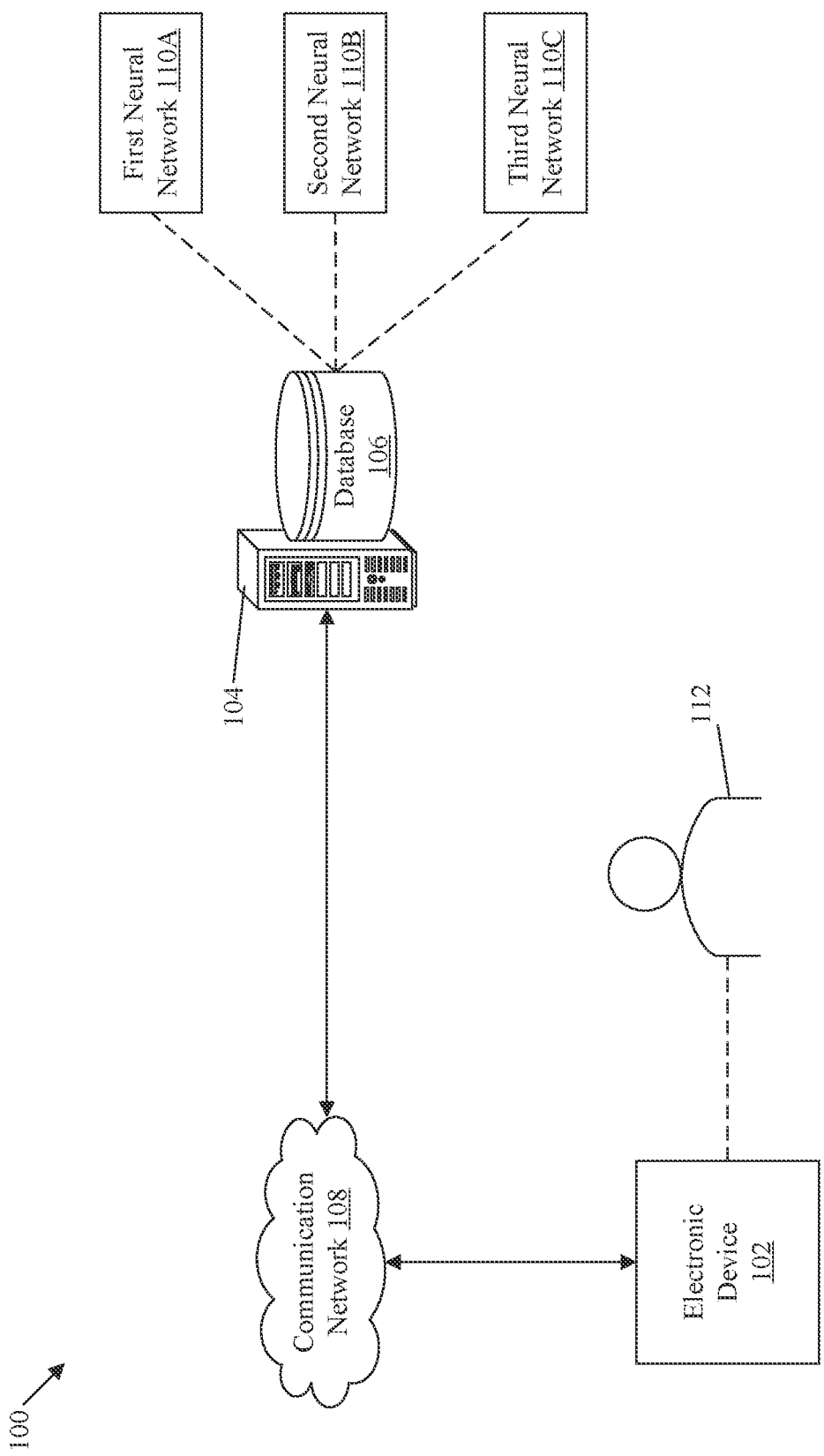
FIG. 1 is a block diagram that illustrates an exemplary environment for disease prognosis based on demographic information and anatomical image using neural network models, in accordance with an embodiment of the disclosure.

The following described implementations may be found in the disclosed electronic device and method of disease prognosis based on demographic information and anatomical image using neural network models. Exemplary aspects of the electronic device may include circuitry that may be configured to receive demographic information (such as, but not limited to, an age, a gender, a nationality, a region, an ethnicity, a household income, a type of diet, a type of lifestyle, a type of job, a medical history, or vaccination information) associated with a person. The electronic device may be configured to determine an ailment associated with an anatomical region (such as, but not limited to, an ocular region, a subcutaneous region, an epidermal region, a dermal region, a hypodermal region, a bone region, or an internal organ region) of the person, based on the application of a first neural network model on the received demographic information. Examples of the ailment may include, but is not limited to, infectious disease, a deficiency disease, a hereditary disease, a genetic disease, a non-genetic disease, a lifestyle-related disease, a hormonal disease, or a physiological disease. The electronic device may be further configured to select a second neural network model from a set of neural network models based on the determined ailment. The electronic device may be configured to receive a first set of images associated with the anatomical region of the person. The electronic device may be configured to apply the selected second neural network model on the received first set of images. The second neural network model may be different from the first neural network model. The electronic device may be configured to determine a first disease severity corresponding to the determined ailment associated with the anatomical region of the person, based on the application of the second neural network model on the received first set of images. Examples of the first disease severity may include, but is not limited to, an incubation stage, a prodromal stage, an acute stage, or a convalescence stage. Further, the electronic device may be configured to control a display device associated with the electronic device to render information about the determined first disease severity and the determined ailment.

Conventional disease prognosis techniques may require a person to be physically present at a testing facility for diagnosis. Further, the existing techniques may require physical contact and/or insertion of a medical/surgical instrument for collection of a sample. Once the sample is collected, various pathological tests may be performed on the collected sample. The time duration to perform the pathological tests may depend on a type of the tests and a number of physiological parameters to be tested. Further, since the pathological tests may be performed by human radiologists/pathologists, chances of human error may exist.

In contrast, the disclosed technique executed by the electronic device may utilize demographic information along with anatomical images associated with a person for automated disease prognosis. Based on application of a first neural network model on the demographic information, an ailment associated with an anatomical region of the person may be determined. Based on the determined ailment, a second neural network model may be selected from a set of neural network models. The second neural network model may be applied on a first set of images (like captured images) associated with the anatomical region of the person to determine a first disease severity corresponding to the determined ailment. The second neural network model may be different from the first neural network model. Further, information about the determined first disease severity and the determined ailment may be displayed to the person. The disclosed technique may use the first neural network model to automatically determine the ailment that may affect the person and also may determine the anatomical region of the ailment based on the demographical information associated with the person. Thus, a first level screening or filtering of common ailments that the person may be prone to suffer from may be identified for further investigation. Thereafter, once the ailment and the anatomical region is determined, the person may be prompted to capture images of the anatomical region or upload previously captured images of the anatomical region for the further investigation. The images of the anatomical region may be analyzed by the second neural network model to automatically determine a severity of a disease corresponding to the ailment. Thus, the process of disease prognosis may be automated based on a systematic identification of an ailment of the person and then an image-based diagnosis of the severity of the disease corresponding to the ailment. The person may not be required to physically go for a pathological test and wait for the test report. The disclosed technique may remotely perform the disease prognosis non-invasively and may give accurate results in a short period of time, which may be critical for further treatment of the person.

FIG. 1 is a block diagram that illustrates an exemplary environment for disease prognosis based on demographic information and anatomical image using neural network models, in accordance with an embodiment of the disclosure. With reference to FIG. 1, there is shown a network environment 100. The network environment 100 may include an electronic device 102, a server 104, a database 106, and a communication network 108. The database 106 may include a set of neural network models, such as, a first neural network model 110A, a second neural network model 1101B, and a third neural network model 110C. The electronic device 102 may be communicatively coupled to the server 104, and the database 106, via the communication network 108. In FIG. 1, there is also shown a person 112 who may be associated with or may operate the electronic device 102.

The electronic device 102 may include suitable logic, circuitry, interfaces, and/or code that may be configured to determine an ailment and a first disease severity of the determined ailment associated with the person 112. The electronic device 102 may be configured to determine an ailment associated with an anatomical region of the person 112, based on an application of the first neural network model 110A on demographic information associated with the person 112. The electronic device 102 may be further configured to select a second neural network model 110B from a set of neural network models based on the determined ailment. In an embodiment, the electronic device 102 may be configured to capture a first set of images of the anatomical region of the person 112. In another embodiment, the first set of images may be pre-stored and the electronic device 102 may receive the first set of images from a memory or from an image capturing device, which stores the first set of images. The electronic device 102 may be configured to apply the selected second neural network model 110B on the first set of images of the anatomical region. The electronic device 102 may be configured to determine a first disease severity corresponding to the determined ailment associated with the anatomical region of the person 112, based on the application of the second neural network model 110B on the received first set of images. Further, the electronic device 102 may be configured to control a display device associated with the electronic device 102 to render information about the determined first disease severity and the determined ailment.

Examples of the electronic device 102 may include, a medical device, a health related machine/engine, a computing device, a desktop, a personal computer, a laptop, a computer workstation, a tablet computing device, a smartphone, a cellular phone, a mobile phone, a consumer electronic (CE) digital device having a display, a television (TV), a wearable display, a head mounted display, a signage, a digital mirror (or a smart mirror), a video wall (which consists of two or more displays tiled together contiguously or overlapped in order to form one large screen), or an edge device connected to a user's home network or an organization's network.

The server 104 may include suitable logic, circuitry, interfaces, and/or code that may be configured to receive demographic information associated with the person 112, and the first set of images associated with the anatomical region (for example, an ocular region, a subcutaneous region, an epidermal region, a dermal region, a hypodermal region, a bone region, or an internal organ region etc.) of the person 112. The server 104 may provide demographic information associated with the person 112, and the first set of images associated with the anatomical region of the person 112, to the electronic device 102. The server 104 may execute operations through web applications, cloud applications, HTTP requests, repository operations, file transfer, and the like. Example implementations of the server 104 may include, but are not limited to, a database server, a file server, a web server, an application server, a mainframe server, a cloud computing server, or a combination thereof.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102 as two separate entities. In certain embodiments, the functionalities of the server 104 can be incorporated in its entirety or at least partially in the electronic device 102, without a departure from the scope of the disclosure.

The database 106 may include suitable logic, interfaces, and/or code that may be configured to store the information associated with the first set of images, the demographical information, and the set of neural network models that may include the first neural network model 110A, the second neural network model 110B, and the third neural network model 110C. In addition to (or instead of) the storage of the set of neural network models (one or more of the first neural network model 110A, the second neural network model 110B, and the third neural network model 110C) on the database 106, in an embodiment, the set of neural network models may be stored in the electronic device 102. Further, the first set of images and the demographic information may also be stored in the electronic device 102.

The database 106 may be derived from data off a relational or non-relational database or a set of comma-separated values (csv) files in conventional or big-data storage. The database 106 may be stored or cached on a device, such as the server 104 or the electronic device 102. The device that stores the database 106 may be configured to receive a query for the information associated with at least one of the first set of images, the demographic information, or the set of neural network models. For example, the query may be received from the electronic device 102. Based on the received query, the database 106 may extract the relevant information and the device hosting the database 106 may transmit the extracted information to the electronic device 102.

In some embodiments, the database 106 may be hosted on a plurality of servers stored at same or different locations. The operations of the database 106 may be executed using hardware including a processor, a microprocessor (e.g., to perform or control performance of one or more operations), a field-programmable gate array (FPGA), or an application-specific integrated circuit (ASIC). In some other instances, the database 106 may be implemented using software.

The communication network 108 may include a communication medium through which the electronic device 102 may be communicatively coupled to the server 104, and the database 106. Examples of the communication network 108 may include, but are not limited to, the Internet, a cloud network, Cellular or Wireless Mobile Network (such as Long-Term Evolution and 5G New Radio), a satellite network (such as, a network of a set of low-earth satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

Each of the set of neural network models (such as, the first neural network model 110A, the second neural network model 1101B, and the third neural network model 110C) may be a computational network or a system of artificial neurons, arranged in a plurality of layers, as nodes. The plurality of layers of each neural network model may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network model. Outputs of each hidden layer may be coupled to inputs of at least one node in other layers of the neural network model. Node(s) in the final layer may receive inputs from at least one hidden layer to output a result. The number of layers and the number of nodes in each layer may be determined from hyper-parameters of the neural network model. Such hyper-parameters may be set before, while training, or after training the neural network model on a training dataset.

Each node of each of the set of neural network models may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network model. All or some of the nodes of the neural network model may correspond to same or a different same mathematical function.

In training of the neural network model, one or more parameters of each node of the neural network model may be updated based on whether an output of the final layer for a given input (from the training dataset) matches a correct result based on a loss function for the neural network model. The above process may be repeated for same or a different input until a minima of loss function may be achieved, and a training error may be minimized. Several methods for training are known in art, for example, gradient descent, stochastic gradient descent, batch gradient descent, gradient boost, meta-heuristics, and the like.

The neural network model may include electronic data, which may be implemented as, for example, a software component of an application executable on the electronic device 102. The neural network model may rely on libraries, external scripts, or other logic/instructions for execution by a processing device, such as circuitry. The set of neural network models may include code and routines configured to enable a computing device, such as circuitry to perform one or more operations. For example, the first neural network model 110A may be applied on the demographic information associated with the person 112 to determine the ailment associated with the anatomical region of the person 112. Further, the second neural network model 110B may be applied the first set of images associated with the anatomical region of the person 112 to determine the first disease severity corresponding to the determined ailment associated with the anatomical region of the person 112. In addition, the third neural network model 110C may be applied on the determined ailment and a determined progression of the determined ailment to generate a therapeutic recommendation. Examples of the generated therapeutic recommendation may include, but are not limited to, a drug recommendation, a dosage recommendation, a treatment recommendation, a diet recommendation, an physical exercise recommendation, breathing exercise recommendation, a sleep recommendation, an activity recommendation, a meditation/yoga recommendation, a walk/jog/run recommendation, a cycling recommendation, a swimming recommendation, a workout recommendation, a music recommendation, or a recreational recommendation. Additionally, or alternatively, the set of neural network models may be implemented using hardware including a processor, a microprocessor (e.g., to perform or control performance of one or more operations), a field-programmable gate array (FPGA), or an application-specific integrated circuit (ASIC). Alternatively, in some embodiments, the set of neural network models may be implemented using a combination of hardware and software.

In an embodiment, the first neural network model 110A may be trained based on at least one of, but not limited to, demographic information, ailment information, anatomical region information, associated with a plurality of different persons. In an embodiment, the second neural network model 110B may be trained based on at least one of, but not limited to, a set of images of the anatomical region of a plurality of different persons and trained further based on a predefined set of disease severities. corresponding to the determined ailment, and the set of images that may be captured over a predefined time span. For example, the predefined set of disease severities may include, but are not limited to, an incubation stage, a prodromal stage, an acute stage, or a convalescence stage. In another embodiment, the second neural network model 110B may be trained based on at least one of, but not limited to, a set of images of the anatomical region of a same person and trained further based on a predefined set of disease severities corresponding to the determined ailment, and the set of images that may be captured over a predefined time span. The third neural network model 110C may be trained based on at least one of demographic information, ailment information, disease progression information, disease severity information, or treatment plan information, associated with a plurality of different persons.

Examples of the set of neural network models may include, but are not limited to, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short-Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In some embodiments, a learning engine of the set of neural network models may include numerical computation techniques using data flow graphs. In certain embodiments, each neural network model may be based on a hybrid architecture of multiple Deep Neural Networks (DNNs).

In operation, the electronic device 102 may be triggered or receive user input to perform disease prognosis for a particular person or for a particular anatomical region of the person. The electronic device 102 may be configured to receive the demographic information associated with the person 112. For example, the demographic information associated with the person 112 may be received by the electronic device 102 as a user input from the person 112. The demographic information may include, but is not limited to, an age, a gender, a nationality, a region, an ethnicity, a household income, a type of diet, a type of lifestyle, a type of job, a medical history, or vaccination information. The demographic information may include, but is not limited to one of an age, a gender (such as male, female transgender etc.), a nationality (such as American, Spanish, German, Indian etc.), a region (such as hilly, tropical, plain etc.), an ethnicity (such as Aboriginal, African American or Black, Asian, European American or White, Native American, Native Hawaiian or Pacific Islander etc.), a household income (i.e. total gross income received by all members of a household within a 12-month period.), a type of diet (such as vegetarian, non-vegetarian, Vegan, Ketogenic etc.), a type of lifestyle (such as rural, urban, beach mountain etc.), a type of job (agriculture, business, employee, etc.), a medical history (such as information about allergies, illnesses, surgeries, immunizations, and results of physical exams and tests etc.), or vaccination information (Rotavirus vaccine, Nasal flu vaccine, Shingles vaccine, Chickenpox vaccine etc.). The reception of the demographic information is described further, for example, in FIG. 3.

The electronic device 102 may be further configured to apply the first neural network model 110A on the received demographic information. The set of neural network models may be stored on the database 106. Based on the application of the first neural network model 110A, the electronic device 102 may determine the ailment associated with the anatomical region of the person 112. For example, the ailments may include, but are not limited to, an infectious disease (such as, flu, measles, HIV, strep throat, and COVID-19), a deficiency disease (such as, Scurvy, Rickets, Beriberi, and Hypocalcemia), a hereditary disease (such as, cystic fibrosis, hemophilia, and sickle cell anemia), a genetic disease (such as, Down syndrome, Trisomy 21, Fragile X syndrome, Klinefelter syndrome, and Triple-X syndrome), a non-genetic disease (such as, heart disease, stroke, cancers, and diabetes), a lifestyle-related disease (such as, heart disease, Atherosclerosis, stroke, respiratory ailments, obesity, and Type-2 diabetes), a hormonal disease (such as, Acromegaly, and Cystic Fibrosis), or a physiological disease (such as, Asthma, Glaucoma, and Diabetes). The anatomical region of the person 112 may include, but is not limited to, an ocular region, a subcutaneous region, an epidermal region, a dermal region, a hypodermal region, a bone region, or an internal organ region. The determination of the ailment based on the demographic information is described further, for example, in FIG. 3.

The electronic device 102 may further receive the first set of images associated with the anatomical region of the person 112. In an example, the first set of images may be received from the database 106. In another example, the first set of images may be captured by an image capture device associated with the electronic device 102 and may be received from the image capture device. In another example, the first set of images may be pre-stored on the electronic device 102 in a memory device (such as a memory 204 in FIG. 2) of the electronic device 102. In such a case, the first set of images may be extracted from the memory device of the electronic device 102. The electronic device 102 may be configured to select the second neural network model 110B from a set of neural network models. The selection of the second neural network model 110B may be based on the determined ailment. The selected second neural network model 110B may be applied on the first set of images. Based on the application of the second neural network model 1101B, the electronic device 102 may determine the first disease severity corresponding to the determined ailment associated with the anatomical region of the person 112.

In an example, the disease severity may correspond to at least one of, but not limited to, an incubation stage, a prodromal stage, an acute stage, or a convalescence stage. For example, the incubation stage may be a time-period it takes for an infection to develop after a person is exposed to a disease-causing organism (such as, bacteria, viruses, or fungi). The incubation stage may end when initial signs or symptoms of the disease may appear for the person. The prodromal stage may correspond to a time-period after the incubation stage and before an occurrence of characteristic symptoms of the infection. A transmission of the infection to other humans in physical contact with the infected person may occur during the prodromal stage. During the prodromal stage, the infectious agent may continue to replicate, which may trigger the infected person's immune response and thereby reduce the symptoms to mild and non-specific. The acute stage of the ailment may correspond to an active replication or multiplication stage of the pathogen, wherein the number of the pathogenic agents in the body of the person may grow exponentially, in a short period of time. In the acute stage, symptoms may be pronounced for the affected organ as well as the entire body of the infected person due to the strong reaction of the immune system. The convalescence stage may correspond to a recovery stage of the ailment in which the symptoms may resolve, and the body of the infected person may return to normalcy.

In an embodiment, the second neural network model 110B may be trained based on at least one of, but not limited to, a set of images of an anatomical region of a plurality of different persons, and trained further based on a predefined set of disease severities corresponding to the determined ailment. The set of images that may be captured, of the plurality of different persons, over a predefined time span. In another embodiment, the second neural network model 110B may be trained based on at least one of, but not limited to, a set of images of the anatomical region of the same person, and trained further based on a predefined set of disease severities corresponding to the determined ailment, and the set of images that may be captured, of the same person, over a predefined time span. The determination of the disease severity is described further, for example, in FIG. 3.

In an embodiment, the electronic device 102 may be configured to control a display device associated with the electronic device 102 to render information about the determined disease severity and the determined ailment. Based on the rendered information, the person 112 or a medical practitioner associated with the person 112 may decide on a treatment plan for the person 112.

Figure 2:
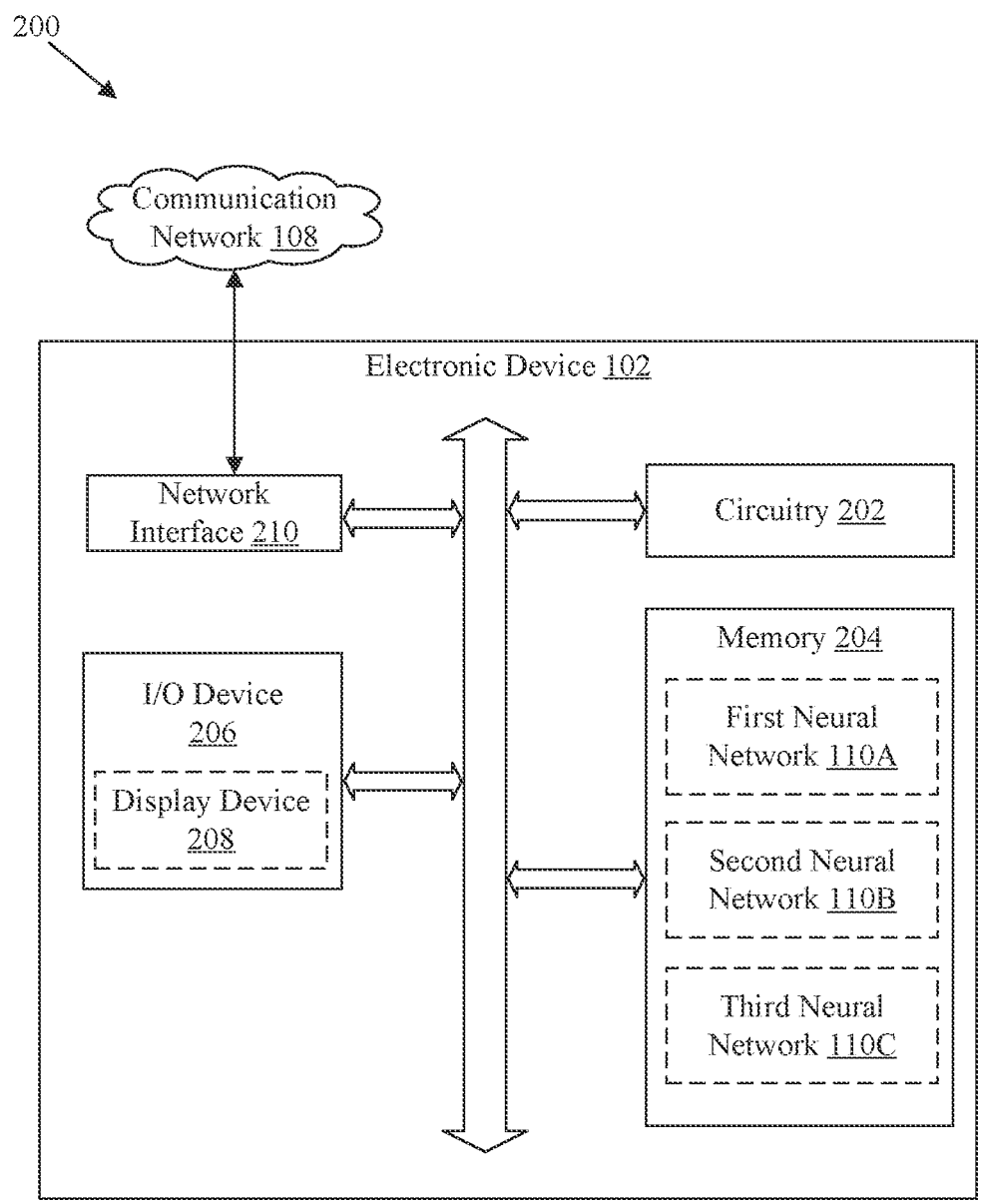
FIG. 2 is a block diagram that illustrates the exemplary electronic device of FIG. 1, in accordance with an embodiment of the disclosure.

FIG. 2 is a block diagram that illustrates the exemplary electronic device of FIG. 1, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202. The electronic device 102 may further include a memory 204, an input/output (I/O) device 206, and a network interface 210. The I/O device 206 may include a display device 208, which may be utilized to render information about the determined disease severity and the determined ailment. The circuitry 202 may be communicatively coupled to the memory 204, the I/O device 206, and the network interface 210. The circuitry 202 may be configured to communicate with the server 104.

The circuitry 202 may include suitable logic, circuitry, and interfaces that may be configured to execute program instructions associated with different operations to be executed by the electronic device 102. For example, the circuitry 202 may be configured to determine an ailment associated with an anatomical region of the person 112, based on the application of the first neural network model 110A on the received demographic information. The circuitry 202 may be further configured to select the second neural network model 110B from the set of neural network models based on the determined ailment. The circuitry 202 may be configured to receive a first set of images associated with the anatomical region of the person 112. The circuitry 202 may be configured to apply the selected second neural network model 110B on the received first set of images. The second neural network model 110B may be different from the first neural network model 110A. The circuitry 202 may be configured to determine the first disease severity corresponding to the determined ailment associated with the anatomical region of the person, based on the application of the second neural network model 110B on the received first set of images. Further, the circuitry 202 may be configured to control the display device 208 associated with the electronic device 102 to render information about the determined first disease severity and the determined ailment. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, and/or interfaces that may be configured to store instructions executable by the circuitry 202. The instructed stored in the memory 204 may be configured to be executed by the circuitry 202 to perform the operations of the electronic device 102 (and/or the circuitry 202). The memory 204 may be further configured to store operating systems and associated applications. The memory 204 may include the set of neural network models such as the first neural network model 110A, the second neural network model 1101B, and the third neural network model 110C. In accordance with an embodiment, the memory 204 may be configured to store the information associated with the ailment, the first set of images, the demographical information. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive a user input. The I/O device 206 may be further configured to provide an output in response to the user input. For example, the I/O device 206 may receive a user input indicative of the demographic information associated with the person 112 for the determination of the ailment of the person 112. The I/O device 206 may further receive a user selection of a set of files corresponding to the first set of images for the determination of the disease severity. The I/O device 206 may render the determined ailment and the determined disease severity associated with the person 112. The I/O device 206 may include various input and output devices, which may be configured to communicate with the circuitry 202. Examples of the input devices may include, but are not limited to, a touch screen, a keyboard, a mouse, a joystick, and/or a microphone. Examples of the output devices may include, but are not limited to, the display device 208 and/or a speaker.

The display device 208 may include suitable logic, circuitry, interfaces, and/or code that may be configured to render the information about the determined disease severity and the determined ailment onto a display screen of the display device 208. In accordance with an embodiment, the display device 208 may include a touch screen to receive the user input. The display device 208 may be realized through several known technologies such as, but not limited to, a Liquid Crystal Display (LCD) display, a Light Emitting Diode (LED) display, a plasma display, and/or an Organic LED (OLED) display technology, and/or other display technologies. In accordance with an embodiment, the display device 208 may refer to a display screen of smart-glass device, a 3D display, a see-through display, a projection-based display, an electro-chromic display, and/or a transparent display.

The network interface 210 may include suitable logic, circuitry, interfaces, and/or code that may be configured to establish a communication between the electronic device 102, and the server 104, via the communication network 108. The network interface 210 may be implemented by use of various known technologies to support wired or wireless communication of the electronic device 102 with the communication network 108. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS). The operation of the circuitry 202 is described in detail, for example, in FIGS. 3, 4, 5, and 6.

Figure 3:
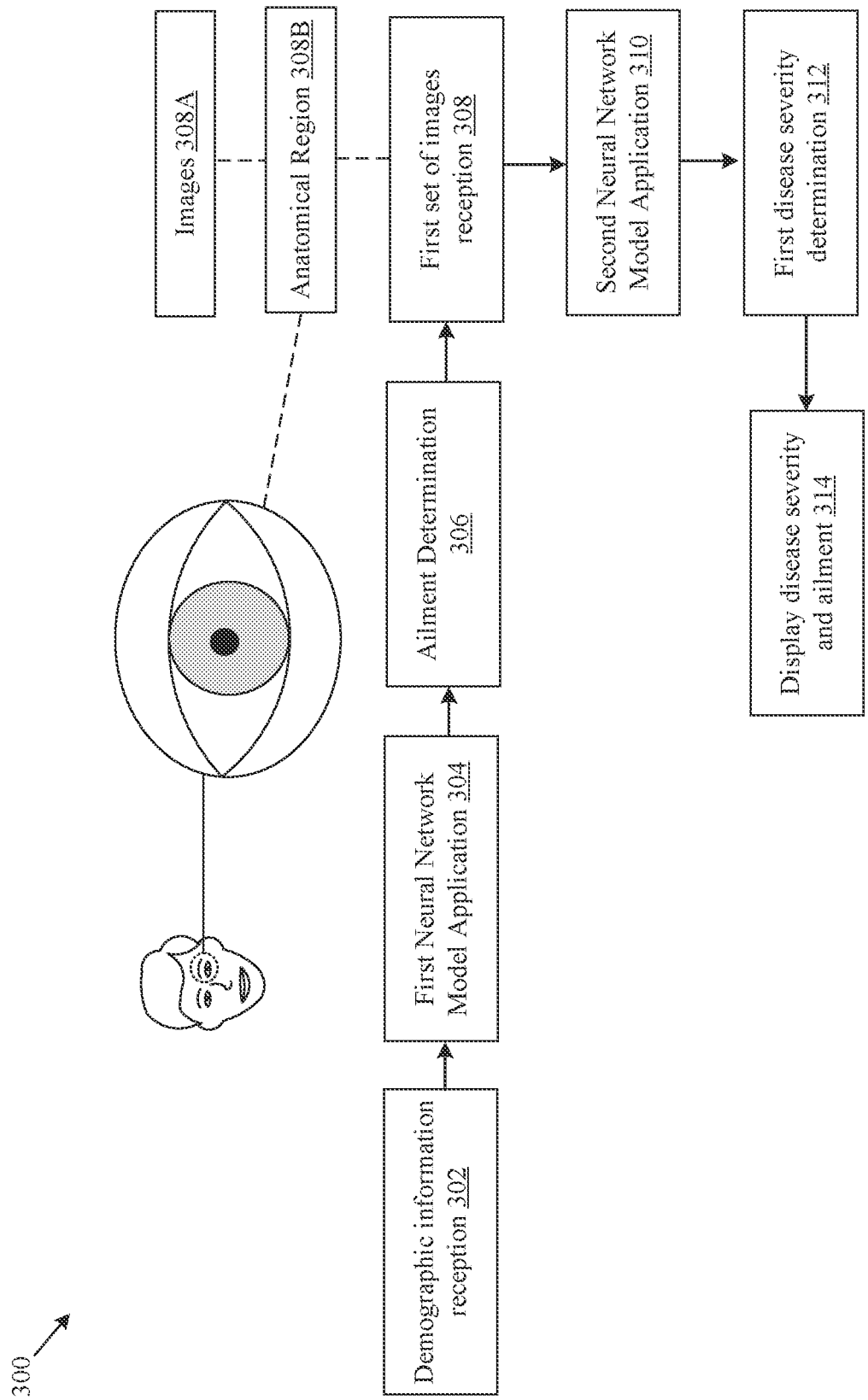
FIG. 3 is a diagram that illustrates an exemplary processing pipeline for disease prognosis based on demographic information and anatomical image using neural network models, in accordance with an embodiment of the disclosure.

FIG. 3 is a diagram that illustrates an exemplary processing pipeline for disease prognosis based on demographic information and anatomical image using neural network models, in accordance with an embodiment of the disclosure. FIG. 3 is explained in conjunction with elements from FIG. 1 and FIG. 2. With reference to FIG. 3, there is shown a processing pipeline 300 for disease prognosis based on demographic information and anatomical image using neural network models. In the processing pipeline 300, there is shown a sequence of operations that may start from 302 and end at 314. The sequence of operations may be executed by the circuitry 202 of the electronic device 102.

At 302, a demographic information reception operation may be executed. In the demographic information reception operation, the circuitry 202 may be configured to receive the demographic information associated with the person 112. The demographic information associated with the person may be received as a user input from the person 112 via the I/O device 206 of the electronic device 102. In another embodiment, the demographic information may be stored on the database 106. The circuitry 202 may send a query for the demographic information to the database 106. Based on the received query, the database 106 may extract the demographic information and transmit the extracted demographic information to the electronic device 102. The demographic information may include information associated with the person 112 that may be used by the circuitry 202 to determine the ailment associated with the anatomical region 308B of the person 112. The demographic information may include, but is not limited to, at least one of an age, a gender (such as, male, female, or other genders), a nationality (such as, American, Spanish, German, Indian, and the like.), or a region (such as hilly, tropical, plain, frigid, and the like), an ethnicity (such as Aboriginal, African American, Black, Asian, European American, White, Native American, Native Hawaiian, Pacific Islander, and the like). The demographic information may further include, but is not limited to, a household income (i.e., a gross income received by all members of a household within a 12-month period), a type of diet (such as, a vegetarian, a non-vegetarian, a Vegan, a Ketogenic, and the like), or a type of lifestyle (such as, rural, urban, beach mountain, and the like). The demographic information may further include, but is not limited to, a type of job (agriculture, business, salaried employee, and the like), a medical history (such as, information about allergies, illnesses, surgeries, immunizations, and results of physical exams and tests, and the like), or vaccination information (Rotavirus vaccine, Nasal flu vaccine, Shingles vaccine, Chickenpox vaccine, Covid-19 vaccine, and the like).

At 304, a first neural network model application operation may be executed. In the first neural network model application operation, the circuitry 202 may be configured to extract the first neural network model 110A from a memory that may store the first neural network model 110A. In case the first neural network model 110A is stored in the database 106, the first neural network model 110A may be extracted from the database 106 and stored in the memory 204. In another scenario, the first neural network model 110A may be pre-stored in the memory 204. In such case, the circuitry 202 may extract the first neural network model 110A from the memory 204. The first neural network model 110A may be trained based on at least one of, but not limited to, demographic information, ailment information, anatomical region information, associated with the plurality of different persons. For example, the first neural network model 110A may be trained based on various factors such as, demographic information (such as ethnicity, nationality, etc.), ailment information, and/or anatomical region information, associated with the plurality of different persons, such that an application of the first neural network model 110A on the demographic information of the person 112 may facilitate the determination of an ailment associated with the person 112. The circuitry 202 may be configured to apply the first neural network model 110A on the demographic information of the person 112. For the application of the first neural network model 110A on the demographic information associated with the person 112, the various parameters (e.g., the age, the gender, the region, the ethnicity, the type of diet, the type of job, and the medical history) of the demographic information may be fed as inputs to the first neural network model 110A.

At 306, an ailment determination operation may be executed. In the ailment determination operation, the circuitry 202 may be configured to determine the ailment associated with the anatomical region 308B of the person 112. Based on the application of the first neural network model 110A on the received demographic information associated with the anatomical region 308B of the person 112, the circuitry 202 may determine the ailment associated with the person 112. For example, the ailments may include, but are not limited to, an infectious disease (such as, flu, measles, HIV, strep throat, and COVID-19), a deficiency disease (such as, Scurvy, Rickets, Beriberi, and Hypocalcemia), a hereditary disease (such as, cystic fibrosis, hemophilia, and sickle cell anemia), a genetic disease (such as, Down syndrome, Trisomy 21, Fragile-X syndrome, Klinefelter syndrome, and Triple-X syndrome), a non-genetic disease (such as, heart disease, stroke, cancers, and diabetes), a lifestyle-related disease (such as, heart disease, Atherosclerosis, stroke, respiratory ailments, obesity, and Type-2 diabetes), a hormonal disease (such as, Acromegaly, and Cystic Fibrosis), or a physiological disease (such as, Asthma, Glaucoma, and Diabetes). The anatomical region of the person 112 may include, but is not limited to, an ocular region, a subcutaneous region, an epidermal region, a dermal region, a hypodermal region, a bone region, or an internal organ region.

In an embodiment, the first neural network model 110A may be trained based on factors such as, demographic information (such as ethnicity, nationality, etc.), ailment information, and/or anatomical region information, associated with the plurality of different persons. Example records of a training dataset associated with the first neural network model 110A is described in conjunction with Table 1, as follows:

TABLE 1

Exemplary training dataset of the first neural network model 110A

| Demography | Ailment | Anatomical Region |
|---|---|---|
| Female, 50-65 years, American, obese, non-veg, retired, medical history of Type-2 Diabetes. | Diabetic Retinopathy | Eyes |
| Male, 30-35 years, Asian, athletic, veg, sedentary desk job, medical history of skin allergy. | Acne | Facial Skin |
| Female, 40-50 years, European, overweight, vegan, sedentary desk job, medical history of vitamin deficiency. | Calcium deficiency | Bones |

With reference to Table 1, for example, the training dataset may include a first record of an American female in the age group of 50-65 years, who may be obese, non-veg, retired, and may have a medical history of Type-2 Diabetes. According to the first record, the person may have an ailment of Diabetic retinopathy, which may affect eyes of the person. Further, the training dataset may include a second record of an Asian male in the age group of 30-35 years, who may be athletic, veg, in a sedentary desk job, and may have a medical history of skin allergy. According to the second record, the person may have an ailment of acne, which may affect facial skin of the person. In addition, the training dataset may include a third record of a European female in the age group of 40-50 years, who may be overweight, vegan, in a sedentary desk job, and may have a medical history of vitamin deficiency. According to the third record, the person may have an ailment of calcium deficiency, which may affect bones of the person. It should be noted that data provided in Table 1 may merely be taken as experimental data and may not be construed as limiting the present disclosure.

In an example, the demographic information of the person 112 may indicate that the person 112 is a 55-year-old Latin-American female, who may be obese and may have a medical condition of diabetes. With reference to Table 1, based on the application of the first neural network model 110A on the demographic information of the person 112, the circuitry 202 may determine that the individual features of the demographic information of the person 112 may have the highest similarity to the first record of the training dataset. Thus, the first neural network model 110A may classify the ailment of the person 112 as "Diabetic retinopathy" and the anatomical region of the person 112 as the eyes of the person 112.

At 308, a first set of images reception operation may be executed. In the first set of images reception operation, the circuitry 202 may be configured to receive a first set of images (e.g., images 308A) associated with an anatomical region 308B of the person 112. For example, as shown in FIG. 3, the anatomical region 308B may correspond to an eye of the person 112. The first set of images (e.g., the images 308A) may include, but are not limited to, a digital image, an analog image, a two-dimensional image, a three-dimensional image, an infrared image, an X-ray image, an ultrasound image etc. In an embodiment, the first set of images (e.g., the images 308A) may be one or more images associated with the whole anatomical region 308B. In another embodiment, the first set of images (e.g., the images 308A) may be one or more images associated with parts of the anatomical region 308B. For example, the anatomical region 308B may be captured in the first set of images (e.g., the images 308A) as a whole or a part of the anatomical region 308B associated with the person 112. In an embodiment, the first set of images (e.g., the images 308A) may be received from the database 106. In another embodiment, the first set of images (e.g., the images 308A) may be captured by an image capture device associated with the electronic device 102 and may be received from the image capture device. In another scenario, the first set of images (e.g., the images 308A) may be pre-stored on the electronic device 102 in the memory 204 of the electronic device 102. In such a case, the first set of images (e.g., the images 308A) may be extracted from the memory 204. The circuitry 202 may be configured to select the second neural network model 110B from a set of neural network models. The selection of the second neural network model 110B may be based on the determined ailment. For example, the memory 204 and/or the database 106 may store the set of neural network models, wherein each model of the set of neural network models may be associated with a certain ailment.

At 310, a second neural network model application operation may be executed. In the second neural network model application operation, the circuitry 202 may be configured to apply the second neural network model 110B on the received first set of images. The selection of the second neural network model 110B from the set of neural network models may be based on the determined ailment. Information about the determined ailment may be stored in the database 106 or may be stored locally in the memory 204 of the electronic device 102. Once, the second neural network model 110B is selected by the circuitry 202, the circuitry 202 may apply the selected second neural network model 110B to the received first set of images associated with the anatomical region 308B of the person 112.

In an embodiment, the second neural network model 110B may be trained based on the set of images of the anatomical region 308B of a plurality of different persons. The set of images may be captured over a predefined time span. The second neural network model 110B may be trained further based on a predefined set of disease severities (for example, an incubation stage, a prodromal stage, an acute stage, or a convalescence stage etc.) corresponding to the determined ailment. Example records of a training dataset associated with the second neural network model 110B is described in conjunction with Table 2, as follows:

TABLE 2

Exemplary training dataset of the second neural network model 110B

| Person and Image Identifier | Ailment and Anatomical Region | Stage of Disease |
|---|---|---|
| Person-1; Image-1 | Diabetic Retinopathy (Eyes) | Stage 1 |
| Person-1; Image-2 | Diabetic Retinopathy (Eyes) | Stage 2 |
| Person-2; Image-3 | Diabetic Retinopathy (Eyes) | Stage 2 |
| Person-3; Image-4 | Diabetic Retinopathy (Eyes) | Stage 2 |
| Person-1; Image-5 | Diabetic Retinopathy (Eyes) | Stage 3 |
| Person-2; Image-6 | Diabetic Retinopathy (Eyes) | Stage 4 |
| Person-3; Image-7 | Diabetic Retinopathy (Eyes) | Stage 4 |

With reference to Table 2, for example, the second neural network model 110B may be associated with an ailment of eyes, such as, Diabetic Retinopathy. The training dataset may include a first record including an "Image-1" of a "Person-1", wherein the "Image-1" may correspond to an image of the eye captured when the "Person-1" suffers from a Stage 1 of the disease (i.e., Diabetic Retinopathy). Similarly, the training dataset may include a second record including an "Image-2" of the "Person-1", wherein the "Image-2" may correspond to an image of the eye captured when the "Person-1" suffers from a Stage 2 of the disease (i.e., Diabetic Retinopathy). Further, the training dataset may include other records, such as, a third record including an "Image-3" of a "Person-2", wherein the "Image-3" may correspond to an image of the eye captured when the "Person-2" suffers from a Stage 2 of the disease (i.e., Diabetic Retinopathy), and so on. It should be noted that data provided in Table 2 may merely be taken as experimental data and may not be construed as limiting the present disclosure.

In another embodiment, the second neural network model 110B may be trained based on a set of images of the anatomical region 308B of the same person, and trained further based on the predefined set of disease severities corresponding to the determined ailment. The set of images of the particular person may be captured over the predefined time span. Another example of records of a training dataset associated with the second neural network model 110B is described in conjunction with Table 3, as follows:

TABLE 3

Another exemplary training dataset of the second neural network model 110B

| Person and Image Identifier | Ailment and Anatomical Region | Stage of Disease |
|---|---|---|
| Person-1; Image-1 | Diabetic Retinopathy (Eyes) | Stage 1 |
| Person-1; Image-2 | Diabetic Retinopathy (Eyes) | Stage 2 |
| Person-1; Image-3 | Diabetic Retinopathy (Eyes) | Stage 2 |
| Person-1; Image-4 | Diabetic Retinopathy (Eyes) | Stage 2 |
| Person-1; Image-5 | Diabetic Retinopathy (Eyes) | Stage 3 |
| Person-1; Image-6 | Diabetic Retinopathy (Eyes) | Stage 4 |
| Person-1; Image-7 | Diabetic Retinopathy (Eyes) | Stage 4 |

With reference to Table 3, for example, the second neural network model 110B may be associated with an ailment of eyes, such as, Diabetic Retinopathy. The training dataset may include images of eyes of the same person, such as, a "Person-1". For example, the training dataset may include an "Image-1", which may correspond to a Stage 1 of the disease (i.e., Diabetic Retinopathy). Similarly, the training dataset may include multiple images corresponding to a Stage 2 of the disease. Examples of such images may include an "Image-2", an "Image-3", and an "Image-4". Further, the training dataset may include an "Image-5" corresponding to a Stage 3 of the disease and may include an "Image-6" and an "Image-7", which may correspond to a Stage 4 of the disease. It should be noted that data provided in Table 3 may merely be taken as experimental data and may not be construed as limiting the present disclosure.

At 312, a first disease severity determination operation may be executed. In the first disease severity determination operation, the circuitry 202 may be configured to determine the first disease severity corresponding to the determined ailment associated with the anatomical region 308B of the person 112. The determination of the first disease severity for the determined ailment may be based on the application of the second neural network model 110B. For example, based on the determination of the ailment (such as an infectious disease, a deficiency disease) associated with the anatomical (such as ocular, dermal etc.) of the person 112, the circuitry 202 may receive the first set of images associated with the anatomical region 308B of the person 112. Further, the circuitry 202 may be configured to apply the second neural network model 110B on the received first set of images to determine the first disease severity corresponding to the determined ailment associated with the anatomical region 308B of the person 112.

In an example, the received first set of images (e.g., the images 308A) may be fed to the second neural network model 110B. The second neural network model 110B may be, for example, a convolution neural network model or a deep learning model. The second neural network model 110B may convert each of the received first set of images to image features associated with the corresponding image. For examples, the features may include edges, lines, pre-determined shapes, brightness, hue, saturation, and contours. Based on the training of the second neural network model 110B, the second neural network model 110B may include predetermined weights of nodes and biases at various layers and hyper-parameters of the second neural network model 110B. The circuitry 202 may apply the predetermined weights, biases, and hyper-parameters to the converted features of each of the received set of images to determine a prediction score associated with each of the set of predefined disease severities. The circuitry 202 may compare the determined prediction score with a predefined threshold to determine the stage of the disease associated with the person 112. For example, based on the received set of images (e.g., the images 308A), the circuitry 202 may determine that the person 112 suffers from Stage 1 of Diabetic Retinopathy.

At 314, an operation to display disease severity and ailment may be executed. In the operation to display the disease severity and the ailment, the circuitry 202 may be configured to control the display device 208 to render information about the determined disease severity and the determined ailment. For example, the circuitry 202 may display the disease severity and the determined ailment, via a user interface, on the display device 208.

Conventional disease prognosis techniques may require a person to be physically present at a testing facility for diagnosis. Further, the existing techniques may require physical contact and/or insertion of a medical/surgical instrument for collection of a sample. Once the sample is collected, various pathological tests may be performed on the collected sample. The time duration to perform the pathological tests may depend on a type of the tests and a number of physiological parameters to be tested. Further, since the pathological tests may be performed by radiologists/pathologists, chances of human error may exist.

In contrast, the electronic device 102 may utilize demographic information along with anatomical images associated with a person for automated disease prognosis. Based on application of the first neural network model 110A on the demographic information, an ailment associated with an anatomical region of the person may be automatically determined. Based on the determined ailment, the second neural network model 110B (i.e., different from the first neural network model 110A) may be selected from a set of neural network models. The second neural network model 110B may be applied on the first set of images (e.g., the images 308A) associated with the anatomical region 308B of the person to determine a first disease severity corresponding to the determined ailment. The information about the determined first disease severity and the determined ailment may be displayed to the person. The electronic device 102 may use the first neural network model 110A to automatically determine the ailment that may affect the person and also may determine the anatomical region of the ailment based on the demographical information associated with the person. Thus, a first level screening or filtering of common ailments that the person may be prone to suffer from may be identified for further investigation. Thereafter, once the ailment and the anatomical region is determined, the person may be prompted to capture images of the anatomical region or upload previously captured images of the anatomical region for the further investigation. The images of the anatomical region may be analyzed by the second neural network model 110B to automatically determine a severity of a disease corresponding to the ailment. Thus, the process of disease prognosis may be automated based on a systematic identification of an ailment of the person and then an image-based diagnosis of the severity of the disease corresponding to the ailment. The person may not be required to physically go for a pathological test and wait for the test report. The electronic device 102 may remotely perform the disease prognosis non-invasively and may give accurate results in a short period time, which may be critical for further treatment of the person.

Figure 4:
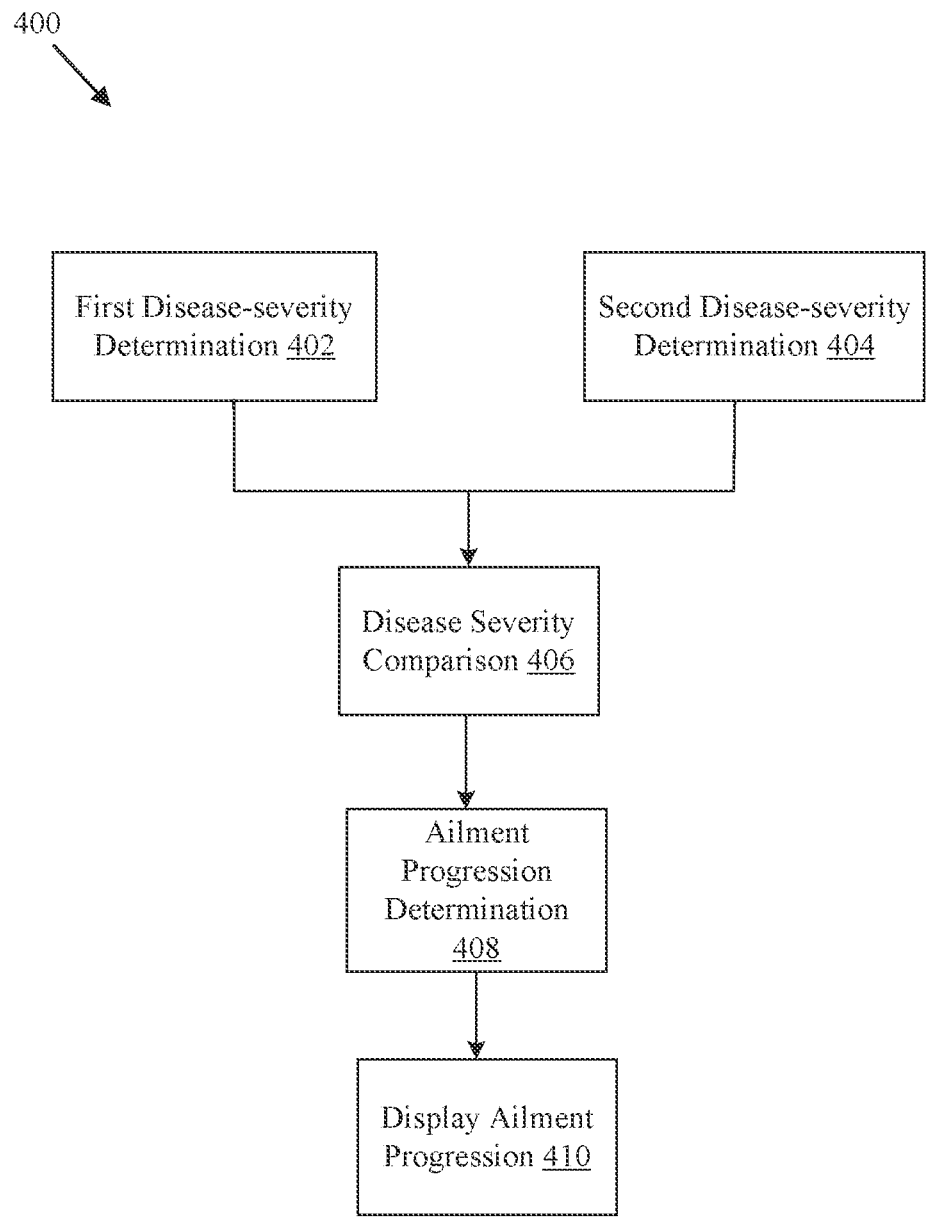
FIG. 4 is a diagram that illustrates an exemplary processing pipeline for determination of ailment progression, in accordance with an embodiment of the disclosure.

FIG. 4 is a diagram that illustrates an exemplary processing pipeline for determination of ailment progression, in accordance with an embodiment of the disclosure. FIG. 4 is explained in conjunction with elements from FIG. 1, FIG. 2, and FIG. 3. With reference to FIG. 4, there is shown a processing pipeline 400 for determination of ailment progression. In the processing pipeline 400, there is shown a sequence of operations that may start from 402 and end at 410. The sequence of operations may be executed by the circuitry 202 of the electronic device 102.

At 402, a first disease severity determination operation may be executed. In the first disease severity determination, the circuitry 202 may be configured to determine the first disease severity corresponding to the determined ailment associated with the anatomical region 308B of the person 112. The circuitry 202 may be configured to receive demographic information associated with the person 112. Based on application of the first neural network model 110A on the demographic information, the ailment associated with the anatomical region 308B of the person may be determined. Based on the determined ailment, the second neural network model 110B may be selected from the set of neural network models. The second neural network model 110B may be applied on the received first set of images associated with the anatomical region 308B of the person to determine the first disease severity corresponding to the determined ailment. The received first set of images may correspond to (or may be captured at) a first time instance. The determination of the first disease severity is described further, for example, in FIG. 3 (at 310 and 312).

At 404, a second disease severity determination operation may be executed. In the second disease severity determination, the circuitry 202 may be configured to determine the second disease severity corresponding to the determined ailment associated with the anatomical region 308B of the person 112. The circuitry 202 may be configured to receive the demographic information associated with the person 112. Based on application of the first neural network model 110A on the demographic information, the ailment associated with the anatomical region 308B of the person 112 may be determined. Based on the determined ailment, the second neural network model 110B may be selected from the set of neural network models. The second neural network model 110B may be applied on the received second set of images associated with the anatomical region 308B of the person 112 to determine a second disease severity corresponding to the determined ailment. The received second set of images may correspond to a second time instance, which may be after the first time instance. The determination of the second disease severity may be similar to the determination of the first disease severity, as described further, for example, in FIG. 3 (at 310 and 312).

At 406, a disease severity comparison operation may be executed. In the disease severity comparison operation, the circuitry 202 may be configured to compare the determined first disease severity and the determined second disease severity. As discussed, the first disease severity corresponds to the first set of images captured at the first time instance, and the second disease severity corresponds to the second set of images captured at the second time instant. The circuitry 202 may compare the first disease severity and the second disease severity to determine a progression of the disease from the first time instance to the second time instance. For example, the person 112 who may be infected by a disease may wish to know a progression of the disease from the first time instance (a time when the disease was initially detected) to the second time instance (a later time). Based on the determination of the progression of the disease, it may be evident whether the person 112 is on a recovery path and the ailment has healed or whether the ailment has worsened.

At 408, ailment progression determination operation may be executed. In the ailment progression determination, the circuitry 202 may be configured to determine a progression of the disease associated with the person 112 based on the comparison of the first disease severity (at the first time instance) with the second disease severity (at the second time instance). It would be appreciated by the person skilled in the art that since the first disease severity is determined based on the first set of images at the first instance, the second disease severity is determined based on the second set of images at the second instant, and that the second time instance is after the first time instance, therefore, comparison of the first disease severity and the second disease severity would facilitate to monitor or analyze progression of the ailment. For example, for the determined ailment of the person 112, it may be necessary to monitor the progression of the ailment to efficiently treat the determined ailment. In some scenarios, the process to determine the ailment progression to monitor treatment of the ailment may be iterated until the determined ailment is completely healed.

At 410, an ailment progression display operation may be executed. In the ailment progression display operation, the circuitry 202 may be configured to control the display device 208 to render information about the determined progression of the determined ailment. The information about the determined progression of the determined ailment of the person 112 may enable the person 112 to go for follow-up consultations with a medical practitioner or adapt a treatment plan for the ailment based on previous consultations with a medical practitioner.

Figure 5:
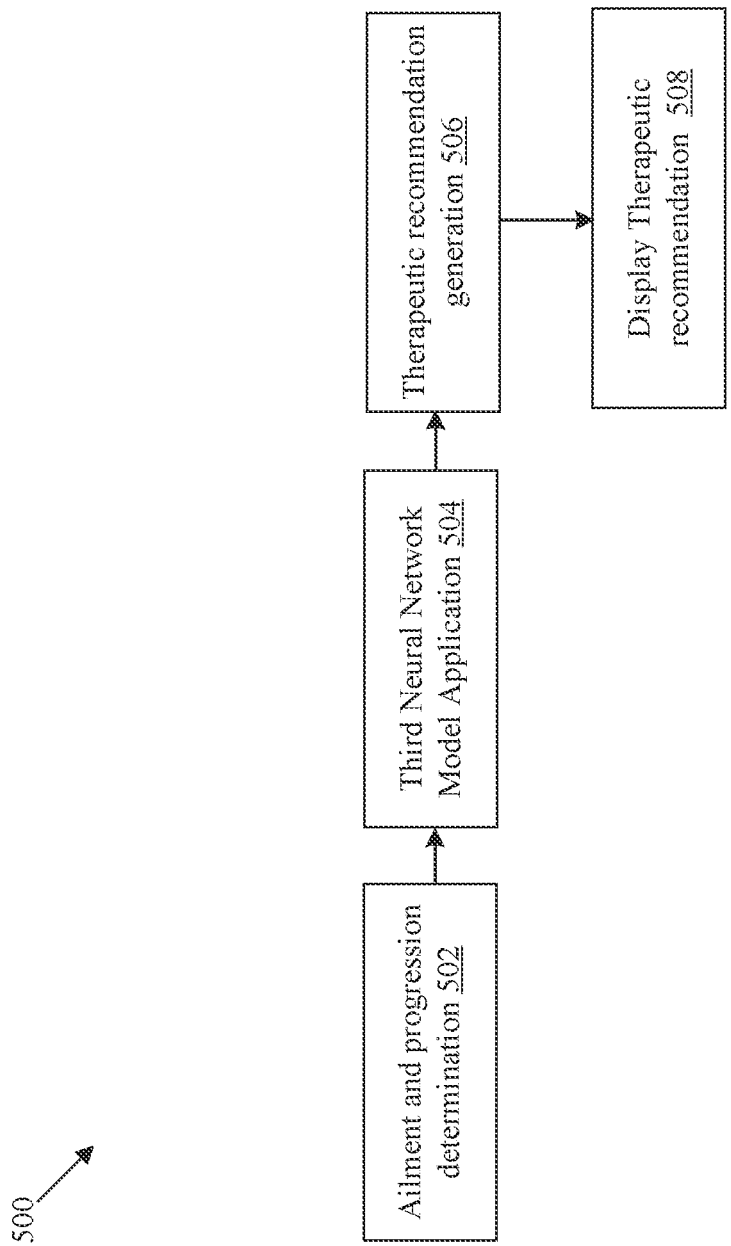
FIG. 5 is a diagram that illustrates an exemplary processing pipeline for determination of therapeutic recommendation, in accordance with an embodiment of the disclosure.

FIG. 5 is a diagram that illustrates an exemplary processing pipeline for determination of therapeutic recommendation, in accordance with an embodiment of the disclosure. FIG. 5 is explained in conjunction with elements from FIG. 1, FIG. 2, FIG. 3, and FIG. 4. With reference to FIG. 5, there is shown a processing pipeline 500 for determination of therapeutic recommendation. In the processing pipeline 500, there is shown a sequence of operations that may start from 502 and end at 508. The sequence of operations may be executed by the circuitry 202 of the electronic device 102.

At 502, an ailment and progression determination operation may be executed. In the ailment and progression determination operation, the circuitry 202 may be configured to determine the progression of the determined ailment based on the comparison of the determined first disease severity at the first time-instance and the determined second disease severity at the second time-instance. The ailment progression determination operation is described further, for example, in FIG. 4 (at 406 and 408).

At 504, a third neural network model application operation may be executed. In the third neural network model application operation, the circuitry 202 may be configured to apply the third neural network model 110C on the determined ailment and the determined progression of the determined ailment. The third neural network model 110C may be trained based on demographic information, ailment information, disease progression information, disease severity information, or treatment plan information, associated with a plurality of different persons. For example, data pertaining to the demographic information (such as the age, the gender, the nationality, the region, the ethnicity, the household income etc.), ailment information (such as infectious disease, a deficiency disease, a hereditary disease etc.), ailment progression information (such as getting healed or worsened etc.), disease severity information (such as the incubation stage, the prodromal stage, an acute stage, or a convalescence stage etc.), or treatment plan information (such as a drug recommendation, a dosage recommendation, a treatment recommendation etc.), associated with a plurality of different persons, may be utilized to train the third neural network model 110C.

At 506, a therapeutic recommendation generation operation may be executed. In the therapeutic recommendation generation operation, the circuitry may be configured to generate therapeutic recommendations based on the application of the third neural network model 110C. The therapeutic recommendation may include, but is not limited to, a drug recommendation, a dosage recommendation, a treatment recommendation, a diet recommendation, a physical exercise recommendation, breathing exercise recommendation, a sleep recommendation, an activity recommendation, a meditation/yoga recommendation, a walk/jog/run recommendation, a cycling recommendation, a swimming recommendation, a workout recommendation, a music recommendation, or a recreational recommendation. The third neural network model 110C when trained might be able to generate therapeutic recommendations based on the application of the third neural network model 110C on the determined ailment and the determined progression of the determined ailment.

For example, the person 112 may suffer from an ailment, such as, Diabetic Retinopathy, and the ailment may be healed (i.e., the progression of the disease) from the Stage 3 (at the first time instance) to the Stage 4 (at the second time instance). Based on the application of the third neural network model 110C on the information about the ailment (i.e., Diabetic Retinopathy) and the progression of the disease (from the Stage 3 to the Stage 4), the circuitry 202 may generate therapeutic recommendations such as, a certain insulin medicine of a certain dosage, a Diabetic diet, a certain eye drops to treat Diabetic Retinopathy.

At 508, a therapeutic recommendation display operation may be executed. In the therapeutic recommendation display operation, the circuitry 202 may be configured to control the display device 208 to render information about the determined therapeutic recommendation. The information about the determined therapeutic recommendation may enable the person 112 to adapt the treatment plan for the ailment and go for a follow-up consultation with a medical practitioner, if required.

Figure 6:
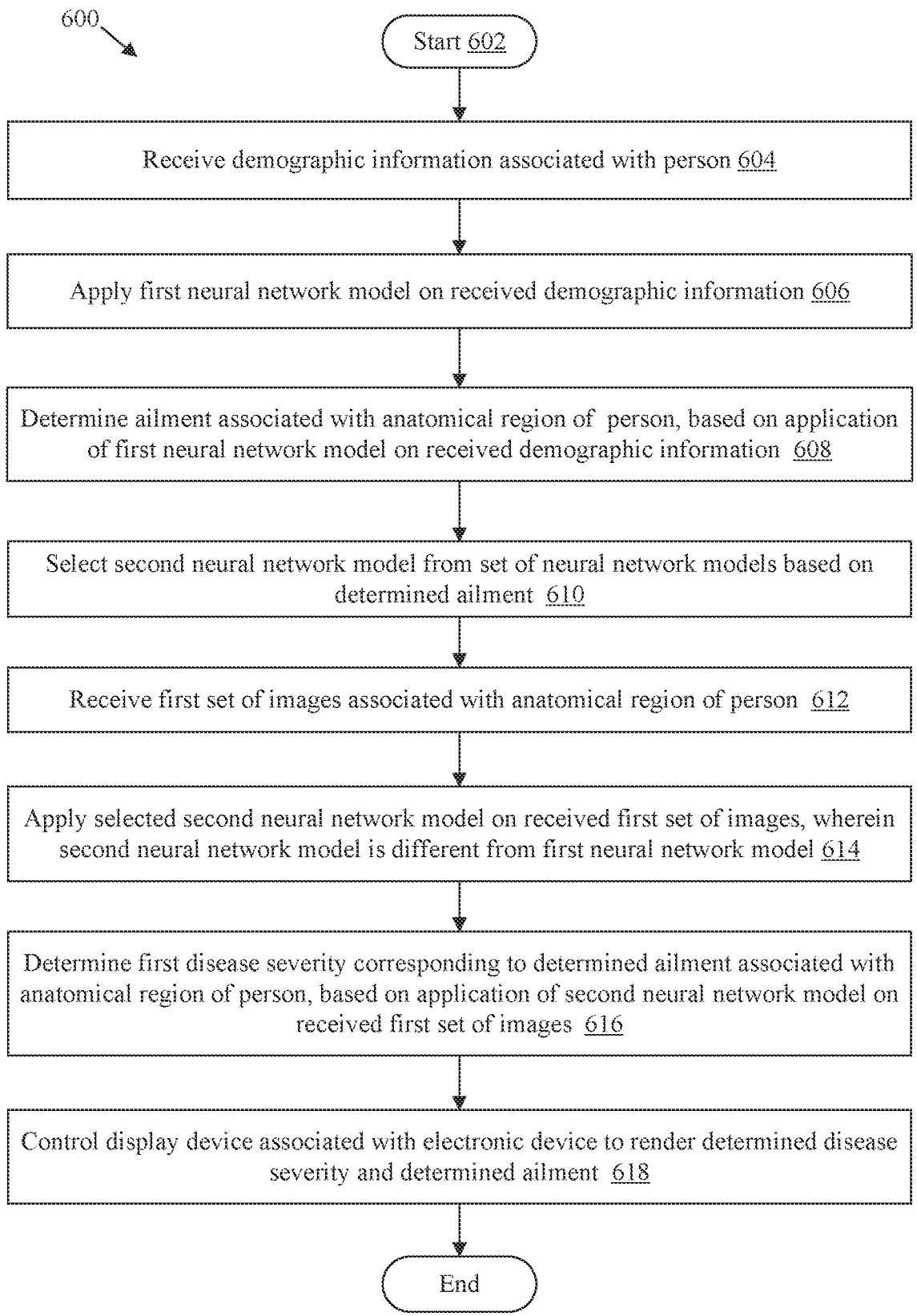
FIG. 6 is a flowchart that illustrates exemplary operations for disease prognosis based on demographic information and anatomical image using neural network models, in accordance with an embodiment of the disclosure.

FIG. 6 is a flowchart that illustrates exemplary operations for disease prognosis based on demographic information and anatomical image using neural network models, in accordance with an embodiment of the disclosure. With reference to FIG. 6, there is shown a flowchart 600. The flowchart 600 is described in conjunction with elements from FIG. 1, FIG. 2, FIG. 3, FIG. 4, and FIG. 5. The flowchart 600 may include operations from 602 to 618 and may be implemented in the electronic device 102 or the circuitry 202. The method described in the flowchart 600 may start at 602 and proceed to 604.

At 604, demographic information associated with a person 112 may be received. The demographic information associated with the person 112 may be received as a user input from the person 112, via the I/O device 206 of an electronic device 102. In another embodiment, the demographic information may be stored on the database 106. The circuitry 202 may send a query for the demographic information to the database 106. Based on the received query, the database 106 may extract the demographic information and transmit the extracted demographic information to the electronic device 102. The demographic information may include information associated with the person 112 that may be used by the circuitry 202 to determine the ailment associated with the anatomical region 308B of the person 112. The reception of the demographic information is described further, for example, in FIG. 3 (at 302).

At 606, a first neural network model may be applied on the received demographic information. The circuitry 202 may be configured to apply the first neural network model 110A on the demographic information of the person 112. For the application of the first neural network model 110A on the demographic information associated with the person 112, the various parameters (e.g., the age, the gender, the region, the ethnicity, the type of diet, the type of job, and the medical history) of the demographic information may be fed as inputs to the first neural network model 110A. The application of the first neural network model 110A on the demographic information of the person 112 may facilitate the determination of an ailment associated with the person 112. The application of the first neural network model 110A is described further, for example, in FIG. 3 (at 304).

At 608, an ailment associated with an anatomical region of the person 112 may be determined, based on the application of the first neural network model 110A on the received demographic information. The circuitry 202 may be configured to determine the ailment associated with the anatomical region 308B, based on the application of the first neural network model 110A. The determination of the ailment is described further, for example, in FIG. 3 (at 306).

At 610, the second neural network model 110B may be selected from a set of neural network models based on the determined ailment. The circuitry 202 may be configured to select the second neural network model 110B from the set of neural network models, based on the determined ailment. The selection of the second neural network model 110B is described further, for example, in FIG. 3 (at 308 and 310).

At 612, a first set of images associated with the anatomical region of the person 112 may be received. In an embodiment, the circuitry 202 may be configured to receive the first set of images associated with the anatomical region 308B of the person 112. The first set of images may include, but is not limited to a digital image, an analog image, a two-dimensional image, a three-dimensional image, an infrared image, an X-ray image, an ultrasound image etc. The reception of the first set of images is described further, for example, in FIG. 3 (at 308).

At 614, the selected second neural network model 110B may be applied on the received first set of images, wherein the second neural network model 110B is different from the first neural network model 110A. In an embodiment, the circuitry 202 may be configured to apply the second neural network model 110B on the received first set of images. The second neural network model 110B may be different from the first neural network model 110A. The application of the second neural network to determine the disease severity is described further, for example, in FIG. 3 (at 310).

At 616, a first disease severity (such as an incubation stage, a prodromal stage, an acute stage, or a convalescence stage etc.) corresponding to the determined ailment associated with the anatomical region 308B of the person 112 may be determined, based on the application of the second neural network model 110B on the received first set of images. The circuitry 202 may be configured to determine the first disease severity corresponding to the determined ailment associated with the anatomical region 308B of the person 112 based on the application of the second neural network model 110B on the received first set of images. The application of the second neural network model 110B to determine the disease severity of the determined ailment is described further, for example, in FIG. 3 (at 312).

At 618, a display device associated with the electronic device 102 may be controlled to render information about the determined disease severity and the determined ailment. The circuitry 202 may be configured to control the display device 208 to render information about the determined disease severity and the determined ailment. Control may pass to the end.

Although the flowchart 600 is illustrated as discrete operations, such as 604, 606, 608, 610, 612, 614, 616, and 618 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include receipt of demographic information associated with a person (e.g., the person 112). The operations may further include application of a first neural network model (e.g., the first neural network model 110A) on the received demographic information. The operations may further include determination of an ailment associated with an anatomical region (e.g., the anatomical region 308B) of the person 112, based on the application of the first neural network model 110A on the received demographic information. The operations may further include selection of a second neural network model (e.g., the second neural network model 1101B) from a set of neural network models based on the determined ailment. The operations may further include reception of a first set of images associated with the anatomical region 308B of the person 112. The operations may further include application of the selected second neural network model 110B on the received first set of images. Herein, the second neural network model 110B may be different from the first neural network model 110A. The operations may further include determination of a first disease severity corresponding to the determined ailment associated with the anatomical region 308B of the person 112, based on the application of the second neural network model 110B on the received first set of images. The operations may further include control of a display device (e.g., the display device 208) associated with the electronic device 102 to render information about the determined disease severity and the determined ailment.

Exemplary aspects of the disclosure may provide an electronic device (such as, the electronic device 102 of FIG. 1) that includes circuitry (such as, the circuitry 202). The circuitry 202 may be configured to receive demographic information associated with a person (e.g., the person 112). The circuitry 202 may be further configured to apply a first neural network model (e.g., the first neural network model 110A) on the received demographic information. The circuitry 202 may be further configured to determine an ailment associated with an anatomical region (e.g., the anatomical region 308B) of the person 112, based on the application of the first neural network model 110A on the received demographic information. The circuitry 202 may be further configured to select a second neural network model (e.g., the second neural network model 1101B) from a set of neural network models based on the determined ailment. The circuitry 202 may be further configured to receive a first set of images associated with the anatomical region 308B of the person 112. The circuitry 202 may be further configured to apply the selected second neural network model 110B on the received first set of images. Herein, the second neural network model 110B may be different from the first neural network model 110A. The circuitry 202 may be further configured to determine a first disease severity corresponding to the determined ailment associated with the anatomical region 308B of the person 112, based on the application of the second neural network model 110B on the received first set of images. The circuitry 202 may be further configured to control of a display device (e.g., the display device 208) associated with the electronic device 102 to render information about the determined disease severity and the determined ailment.

In an embodiment, the anatomical region may include at least one of an ocular region, a subcutaneous region, an epidermal region, a dermal region, a hypodermal region, a bone region, or an internal organ region. Further, the demographic information associated with the person may include at least one of an age, a gender, a nationality, a region, an ethnicity, a household income, a type of diet, a type of lifestyle, a type of job, a medical history, or vaccination information. In addition, the ailment may include at least one of an infectious disease, a deficiency disease, a hereditary disease, a genetic disease, a non-genetic disease, a lifestyle-related disease, a hormonal disease, or a physiological disease.

In an embodiment, the first neural network model 110A may be trained based on at least one of demographic information, ailment information, anatomical region information, associated with a plurality of different persons.

In an embodiment, the circuitry 202 may be further configured to receive a second set of images associated with the anatomical region 308B of the person 112. The received first set of images may correspond to a first time instance and the received second set of images may correspond to a second time instance. The second time instance may be after the first time instance. The circuitry 202 may be further configured to apply the selected second neural network model 110B on the received second set of images. The circuitry 202 may be further configured to determine a second disease severity corresponding to the determined ailment associated with the anatomical region of the person, based on the application of the second neural network model 110B on the received second set of images.

In an embodiment, the second neural network model 110B may be trained based on a set of images of the anatomical region 308B of a plurality of different persons, and trained further based on a predefined set of disease severities corresponding to the determined ailment. The set of images may be captured over a predefined time span.

In an embodiment, the second neural network model 110B may be trained based on a set of images of the anatomical region 308B of a same person, and trained further based on a predefined set of disease severities corresponding to the determined ailment. The set of images may be captured over a predefined time span.

In an embodiment, each of the determined first disease severity and the determined second disease severity may correspond to at least one of an incubation stage, a prodromal stage, an acute stage, or a convalescence stage.

In an embodiment, the circuitry 202 may be further configured to compare the determined first disease severity and the determined second disease severity. The circuitry 202 may be further configured to determine a progression of the determined ailment based on the comparison of the determined first disease severity and the determined second disease severity. The circuitry 202 may be further configured to control the display device 208 associated with the electronic device to render information about the determined progression of the determined ailment.

In an embodiment, the circuitry 202 may be further configured to apply a third neural network model (e.g., the third neural network model 110C) on the determined ailment and the determined progression of the determined ailment. The circuitry 202 may be further configured to generate a therapeutic recommendation based on the application of the third neural network model 110C on the determined ailment and the determined progression. The circuitry 202 may be further configured to control the display device 208 associated with the electronic device 102 to render the information about the determined progression of the determined ailment.

In an embodiment, the therapeutic recommendation may correspond to at least one of a drug recommendation, a dosage recommendation, a treatment recommendation, a diet recommendation, an physical exercise recommendation, breathing exercise recommendation, a sleep recommendation, an activity recommendation, a meditation/yoga recommendation, a walk/jog/run recommendation, a cycling recommendation, a swimming recommendation, a workout recommendation, a music recommendation, or a recreational recommendation.

In an embodiment, the third neural network model 110C may be trained based on demographic information, ailment information, disease progression information, disease severity information, or treatment plan information, associated with a plurality of different persons.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic device, comprising:
   circuitry configured to:
   receive demographic information associated with a person;
   apply a first neural network model on the received demographic information;
   determine, based on the applied first neural network model, an ailment associated with an anatomical region of the person;
   select a second neural network model from a set of neural network models, based on the determined ailment;

receive a first set of images associated with the anatomical region of the person;
apply the selected second neural network model on the received first set of images, wherein the second neural network model is different from the first neural network model;
determine a first disease severity corresponding to the determined ailment associated with the anatomical region of the person, wherein the first disease severity is determined based on the application of the second neural network model on the received first set of images; and
control a display device associated with the electronic device to render information about the determined first disease severity and the determined ailment.

2. The electronic device according to claim 1, wherein the anatomical region includes at least one of an ocular region, a subcutaneous region, an epidermal region, a dermal region, a hypodermal region, a bone region, or an internal organ region.

3. The electronic device according to claim 1, wherein the demographic information associated with the person includes at least one of an age, a gender, a nationality, a region, an ethnicity, a household income, a type of diet, a type of lifestyle, a type of job, a medical history, or vaccination information.

4. The electronic device according to claim 1, wherein the ailment includes at least one of an infectious disease, a deficiency disease, a hereditary disease, a genetic disease, a non-genetic disease, a lifestyle-related disease, a hormonal disease, or a physiological disease.

5. The electronic device according to claim 1, wherein the first neural network model is trained based on at least one of demographic information, ailment information, or anatomical region information, associated with a plurality of different persons.

6. The electronic device according to claim 1, wherein the circuitry is configured to:
receive a second set of images associated with the anatomical region of the person, wherein
the received first set of images corresponds to a first time instance and the received second set of images corresponds to a second time instance, and
the second time instance is after the first time instance;
apply the selected second neural network model on the received second set of images; and
determine a second disease severity corresponding to the determined ailment associated with the anatomical region of the person, based on the application of the second neural network model on the received second set of images.

7. The electronic device according to claim 6, wherein
the second neural network model is trained based on a set of images of the anatomical region of a plurality of different persons, and trained further based on a predefined set of disease severities corresponding to the determined ailment, and
the set of images is captured over a predefined time span.

8. The electronic device according to claim 6, wherein
the second neural network model is trained based on a set of images of the anatomical region of a same person, and trained further based on a predefined set of disease severities corresponding to the determined ailment, and
the set of images is captured over a predefined time span.

9. The electronic device according to claim 6, wherein each of the determined first disease severity and the determined second disease severity corresponds to at least one of an incubation stage, a prodromal stage, an acute stage, or a convalescence stage.

10. The electronic device according to claim 6, wherein the circuitry is configured to:
compare the determined first disease severity and the determined second disease severity;
determine a progression of the determined ailment based on the comparison of the determined first disease severity and the determined second disease severity; and
control the display device associated with the electronic device to render information about the determined progression of the determined ailment.

11. The electronic device according to claim 10, wherein the circuitry is configured to:
apply a third neural network model on the determined ailment and the determined progression of the determined ailment;
generate a therapeutic recommendation based on the application of the third neural network model on the determined ailment and the determined progression; and
control the display device associated with the electronic device to render information about the generated therapeutic recommendation.

12. The electronic device according to claim 11, wherein the therapeutic recommendation corresponds to at least one of a drug recommendation, a dosage recommendation, a treatment recommendation, a diet recommendation, a physical exercise recommendation, breathing exercise recommendation, a sleep recommendation, an activity recommendation, a meditation/yoga recommendation, a walk/jog/run recommendation, a cycling recommendation, a swimming recommendation, a workout recommendation, a music recommendation, or a recreational recommendation.

13. The electronic device according to claim 11, wherein the third neural network model is trained based on demographic information, ailment information, ailment progression information, disease severity information, or treatment plan information, associated with a plurality of different persons.

14. A method, comprising:
in an electronic device:
receiving demographic information associated with a person;
applying a first neural network model on the received demographic information;
determining, based on the applied first neural network model, an ailment associated with an anatomical region of the person;
selecting a second neural network model from a set of neural network models based on the determined ailment;
receiving a first set of images associated with the anatomical region of the person;
applying the selected second neural network model on the received first set of images, wherein the second neural network model is different from the first neural network model;
determining a first disease severity corresponding to the determined ailment associated with the anatomical region of the person, wherein the first disease severity is determined based on the application of the second neural network model on the received first set of images; and controlling a display device associated with the electronic device to render information about the determined first disease severity and the determined ailment.

15. The method according to claim 14, wherein the first neural network model is trained based on at least one of demographic information, ailment information, or anatomical region information, associated with a plurality of different persons.

16. The method according to claim 14, further comprising:
receiving a second set of images associated with the anatomical region of the person, wherein
the received first set of images corresponds to a first time instance and the received second set of images corresponds to a second time instance, and
the second time instance is after the first time instance;
applying the selected second neural network model on the received second set of images; and
determining a second disease severity corresponding to the determined ailment associated with the anatomical region of the person, based on the application of the second neural network model on the received second set of images.

17. The method according to claim 16, wherein
the second neural network model is trained based on a set of images of the anatomical region of a plurality of different persons, and trained further based on a predefined set of disease severities corresponding to the determined ailment, and
the set of images is captured over a predefined time span.

18. The method according to claim 14, further comprising:
applying a third neural network model on the determined ailment and a progression of the determined ailment;
generating a therapeutic recommendation based on the application of the third neural network model on the determined ailment and the progression; and
controlling the display device associated with the electronic device to render information about the progression of the determined ailment.

19. The method according to claim 18, wherein the third neural network model is trained based on demographic information, ailment information, disease progression information, disease severity information, or treatment plan information, associated with a plurality of different persons.

20. A non-transitory computer-readable medium having stored thereon, computer-executable instructions that when executed by an electronic device, causes the electronic device to execute operations, the operations comprising:
receiving demographic information associated with a person;
applying a first neural network model on the received demographic information;
determining, based on the applied first neural network model, an ailment associated with an anatomical region of the person;
selecting a second neural network model from a set of neural network models based on the determined ailment;
receiving a first set of images associated with the anatomical region of the person;
applying the selected second neural network model on the received first set of images, wherein the second neural network model is different from the first neural network model;
determining a first disease severity corresponding to the determined ailment associated with the anatomical region of the person, wherein the first disease severity is determined based on the application of the second neural network model on the received first set of images; and
controlling a display device associated with the electronic device to render information about the determined first disease severity and the determined ailment.

\* \* \* \* \*